United States Patent [19]
Nagano

[11] Patent Number: 5,426,291
[45] Date of Patent: Jun. 20, 1995

[54] READER WITH A/D CONVERSION AND HIGH PRECISE AND HIGH SPEED MODES

[75] Inventor: Fumikazu Nagano, Yamato-Koriyama, Japan

[73] Assignee: Sharp Kabushiki Kaisha, Osaka, Japan

[21] Appl. No.: 196,403

[22] Filed: Feb. 15, 1994

[30] Foreign Application Priority Data

Feb. 23, 1993 [JP] Japan .................................. 5-032902

[51] Int. Cl.⁶ ............................................ H01J 40/14
[52] U.S. Cl. ................................ 250/208.1; 348/311
[58] Field of Search ............ 250/208.1, 208.2, 214 R, 250/214 A; 348/572, 573, 294, 311

[56] References Cited

U.S. PATENT DOCUMENTS

| | | | |
|---|---|---|---|
| 4,641,185 | 2/1987 | Alston et al. | 348/573 |
| 4,772,958 | 9/1988 | Suzuki . | |
| 5,252,818 | 10/1993 | Gerlach et al. | 250/208.1 |

FOREIGN PATENT DOCUMENTS 093411 11/1983 European Pat. Off. .
542267  5/1993 European Pat. Off. .

*Primary Examiner*—David C. Nelms

[57] ABSTRACT

Each of even series outputs of a CCD is clamped by a third capacitor and a fifth transistor in a high precise mode of a reader. Each of odd series outputs of the CCD is clamped by a first capacitor and a second transistor. The clamped odd and even series outputs are converted to digital signals by a first AD converter. In a high speed mode of the reader, odd series outputs of the CCD are clamped in a unit of one line period by first and second capacitors and the second transistor. In the high speed mode, even series outputs of the CCD are clamped in the unit of one line period by third and fourth capacitors and a fifth transistor. The clamped odd and even series outputs are respectively converted to digital signals by individual first and second AD converters. In this reader, the high precise mode or the high speed mode can be selected in accordance with necessity.

16 Claims, 16 Drawing Sheets

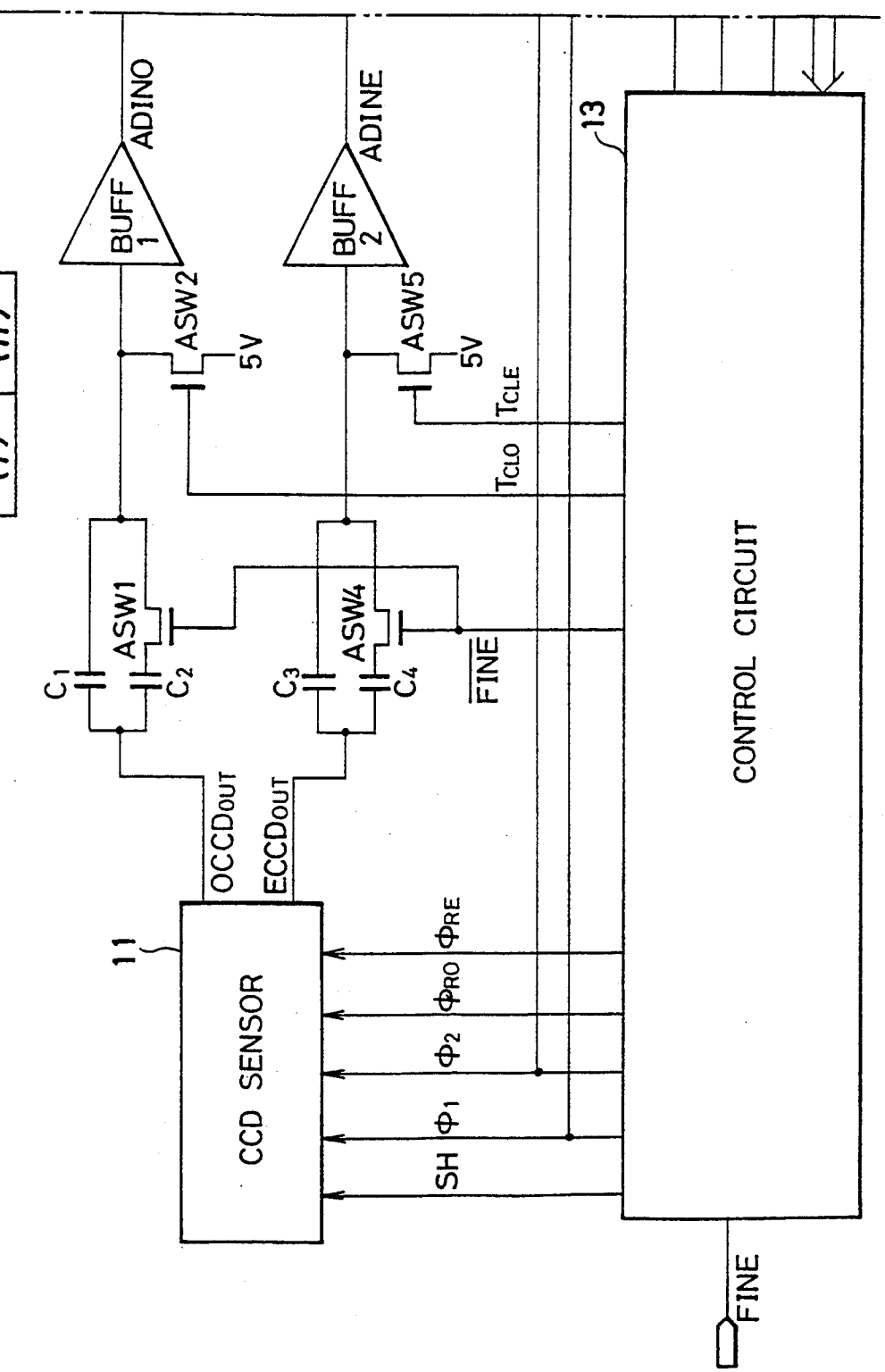

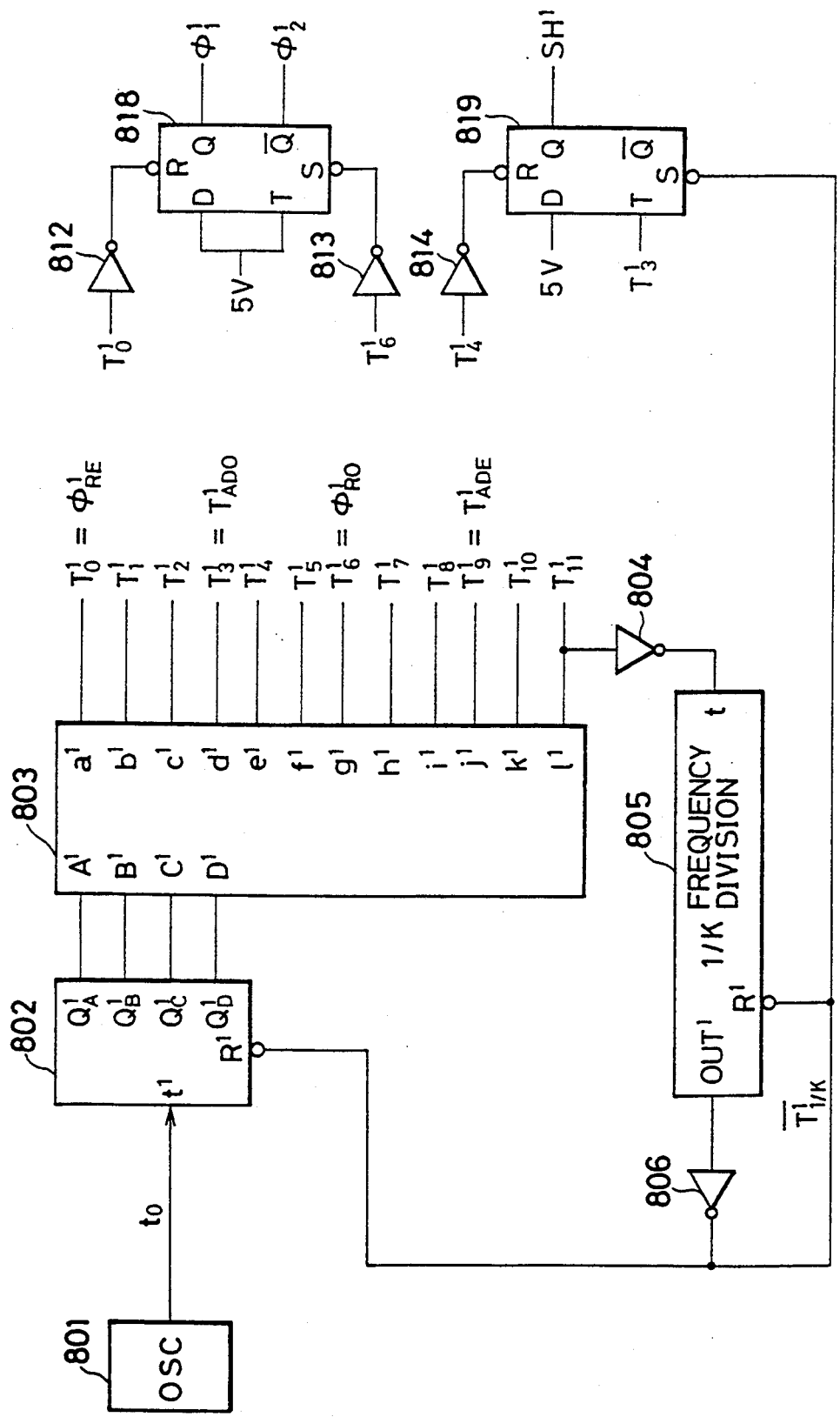

READER WITH A/D CONVERSION AND HIGH PRECISE AND HIGH SPEED MODES

BACKGROUND OF THE INVENTION

1. Field of the Invention

The present invention relates to a reader using an image sensor such as a CCD (charge coupled device) sensor.

2. Description of the Related Art

Recently, a reader using a CCD sensor has been widely used as a means for inputting documents and graphic data to a computer, or an inputting means of each of a digital copying machine and a facsimile telegraph.

FIG. 9 is a block diagram of a CCD sensor used in such a reader. In this reader, signals of odd series analog shift registers and even series analog shift registers are finally synthesized in a line and outputted. Each of $S_1$, $S_2$, - - - , $S_N$ designates a light receiving portion. Each of $OSR_1$, $OSR_2$, - - - , $OSR_{N/2}$ designates an odd side shift register for shift-out of an analog output of each of odd side light receiving portions arranged in an odd series. Each of $ESR_1$, $ESR_2$, - - - , $ESR_{N/2}$ designates an even side shift register for shift-out of an analog output of each of even side light receiving portions arranged in an even series. BUFF designates a buffer amplifier. SH designates a start pulse for starting a shifting operation of each of the shift registers. Each of $\phi_1$ and $\phi_2$ designates a transfer pulse. $\phi_R$ designates a reset pulse. $CCD_{OUT}$ designates an output of a charge coupled device (CCD).

FIG. 5 shows a CCD sensor having two output channels. This CCD sensor can perform a scanning operation at a speed at least two times in comparison with the charge coupled device (CCD) shown in FIG. 9. Each of $S_1$, $S_2$, - - - , $S_N$ designates a light receiving portion. Each of $OSR_1$, $OSR_2$, - - - , $OSR_{N/2}$ designates an odd side shift register for shift-out of an analog output of each of odd side light receiving portions arranged in an odd series. Each of $ESR_1$, $ESR_2$, - - - , $ESR_{N/2}$ designates an even side shift register for shift-out of an analog output of each of even side light receiving portions arranged in an even series. OBUFF designates an odd side buffer amplifier. EBUFF designates an even side buffer amplifier. SH designates a start pulse for starting a shifting operation of each of the shift registers. Each of $\phi_1$ and $\phi_2$ designates a transfer pulse. Each of $\phi_{RE}$ and $\phi_{RO}$ designates a reset pulse. $OCCD_{OUT}$ designates an output of a charge coupled device (CCD) in each of the odd side light receiving portions. $ECCD_{OUT}$ designates an output of a charge coupled device (CCD) in each of the even side light receiving portions.

There is an image reader using such a CCD sensor having two output channels. In this image reader, each of an odd side output and an even side output is converted to a digital signal by an independent A/D converter to increase a scanning speed.

FIG. 3 is an explanatory view for explaining the relation in position between a linear fluorescent lamp 33 and a CCD sensor 37 in a reader. In FIG. 3, an original 31 is arranged on a glass table 32. The original 31 is separated from the glass table 32 in this figure. However, in reality, the original 31 comes in close contact with the glass table 32. Light is emitted from the fluorescent lamp 33 arranged in a state in which a longitudinal direction of the fluorescent lamp 33 is perpendicular to a paper face. This light is transmitted through the glass table 32 and is irradiated onto the original 31. Light reflected on the original 31 is again transmitted through the glass table and is reflected on a mirror 35. Light reflected on the mirror 35 is converged by a lens 36 and is irradiated on a light receiving face of the CCD sensor 37. An optical unit 34 includes the mirror 35, the lens 38 and the CCD sensor 37. Reference numerals 38 and 39 respectively designate a pulse motor and a cabinet.

FIG. 4 is a block diagram of a general reader. In FIG. 4, reference numeral 40 designates the CCD sensor shown in FIG. 9. The CCD sensor 40 is connected to an input portion of a buffer 41 through a capacitor C. A power of 5 volts is connected to this input portion of the buffer 41 through a transistor ASW. An output portion of the buffer 41 is connected to an input portion of an AD converter 42. Terminal portions of outputs $D_0$ to $D_7$ of the AD converter 42 are connected to a control circuit 43. A FLON output portion of the control circuit 43 is connected to an input portion of a lighting device 48. An output portion of the lighting device 48 is connected to an input portion of a fluorescent lamp 33. If FLON shows value "1", the fluorescent lamp 33 is turned on.

Terminal portions of outputs $T_{STEP}$ and FOWARD of the control circuit 43 are connected to an input portion of a pulse motor driving circuit 46. An output portion of the pulse motor driving circuit 46 is connected to an input portion of a pulse motor 38. When the pulse motor driving circuit 48 receives one $T_{STEP}$ pulse at the time of FOWARD="1", the pulse motor driving circuit 46 rotates the pulse motor 38 such that the optical unit 34 and the fluorescent lamp 33 shown in FIG. 3 are advanced by one step. Similarly, when the pulse motor driving circuit 46 receives the $T_{STEP}$ pulse at the time of FOWARD="0", the pulse motor driving circuit 48 rotates the pulse motor 38 such that the optical unit 34 and the fluorescent lamp 33 are retreated.

The control circuit 43 has an oscillator 44 and a clock generating circuit 45 connected to the oscillator 44. The oscillator 44 oscillates a basic clock signal $t_0$. The clock generating circuit 45 divides a frequency of the basic clock signal $t_0$ and generates various kinds of clock signals SH, $\phi_1$, $\phi_2$, $\phi_R$ and $T_{CLAMP}$. The clock signals SH, $\phi_1$, $\phi_2$ and $\phi_R$ are transmitted to the CCD sensor 40. The clock signal $T_{CLAMP}$ is transmitted to a transistor ASW as an analog switch.

FIG. 2 shows timings of clock signals SH, $\phi_1$, $\phi_2$ and $\phi_R$ as driving signals transmitted to the CCD sensor 40, a CCD output signal $CCD_{OUT}$, a signal $T_{CLAMP}$ for clamping the CCD output signal, and an input signal ADIN transmitted to the AD converter 42.

Operations of the transistor ASW and the capacitor C shown in FIG. 4 will next be described with reference to FIG. 10. No output $CCD_{OUT}$ of the CCD sensor 40 is normally determined with respect to a direct current (DC) voltage. As shown in FIG. 2 for example, the output $CCD_{OUT}$ is transmitted in a minus voltage direction with 4 volts as a reference. This output $CCD_{OUT}$ is dispersed from 4 V to a voltage value such as 3.5 V or 4.5 V in accordance with CCD sensors. However, the AD converter converts an analog potential equal to or lower than 5 V to a digital potential. Therefore, it is necessary to shift a DC voltage level such that a voltage equal to or lower than 5 V is outputted to the AD converter by the capacitor C and the transistor ASW. Accordingly, 1 volt is applied to the capacitor C at any time.

There is a load in a long transmission path of the output $CCD_{OUT}$. Accordingly, an amplifier is normally used to amplify the output $CCD_{OUT}$. Therefore, noises of this amplifier are included in this output $CCD_{OUT}$ at random. For example, the DC voltage level of the output $CCD_{OUT}$ is normally set to 4 V. However, when this DC voltage of the output $CCD_{OUT}$ is changed to 3.8 V by the above random noises as shown in FIG. 11, 1.2 V must be rapidly applied to the above capacitor C. Namely, 1.2 V greater than the normal 1 V by 0.2 V must be rapidly applied to the capacitor C. Accordingly, when a clamping time t is set to 300 nsec and a turning-on resistance R of the analog switch ASW is set to 50 Ω, a capacity of the capacitor C satisfies the following condition.

$$C \times R << t$$

$$C \leq 300 \text{ nsec}/50\Omega = 6000 \text{p F}$$

In a general scanner, the capacity of the capacitor C is selectively set to be equal to or smaller than 1000 pF. As is well known, an image having reduced random noises can be obtained in a reader by reliably clamping a DC voltage level of each of outputs of the CCD sensor. However, as shown in FIG. 2, it is necessary to further set a stabilizing period of the output $CCD_{OUT}$ before and after the clamp signal $T_{CLAMP}$ so that a basic clock signal is slowly transmitted and a scanning speed is finally reduced.

As mentioned above, an image having reduced random noises can be obtained in a reader by reliably clamping the DC voltage level of each of outputs of the CCD sensor. However, it is necessary to further set a stabilizing period of the output $CCD_{OUT}$ before and after the clamp signal $T_{CLAMP}$ so that an operating speed of the reader is reduced.

When two AD converters are used to increase the operating speed of the reader, AD-converting characteristics are different from each other in accordance with the AD converters so that periodic image stripes are caused on odd and even sides of the AD converters.

SUMMARY OF THE INVENTION

It is therefore an object of the present invention to provide a reader in which a high precise mode or a high speed mode can be selected in accordance with necessity, and a reading speed of the reader is increased at a time of the high speed mode, and a reading operation of the reader can be performed with high image quality at a time of the high precise mode.

The above object of the present invention can be achieved by a reader having a high precise mode and a high speed mode and comprising an image sensor for separately outputting outputs of light receiving portions arranged in odd and even series; a first AD converter corresponding to one of the odd and even series outputs; a second AD converter corresponding to the other of the odd and even series outputs; and means for supplying the other of the odd and even series outputs to the first AD converter when the high precise mode is selected.

Further, the above reader as a first reader preferably comprises output selecting means for inputting outputs of the first and second AD converters thereto. The output selecting means alternately outputs the outputs from the first and second AD converters in the high speed mode. The output selecting means outputs the output from the first AD converter in the high precise mode.

The above object of the present invention can be also achieved by a reader having a high precise mode and a high speed mode and comprising an image sensor; DC level clamping means for clamping a DC voltage level of each of image sensor outputs in the high precise mode and clamping a DC voltage level of an image sensor output in a unit of one line period in the high speed mode; and an AD converter for digitally converting the image sensor output clamped at the DC voltage level.

In this reader as a second reader, the clamping means preferably has switching means connected to a clamp voltage source and a capacitor having a capacity variable in accordance with the high precise mode and the high speed mode. Further, the clamping means preferably has clamp pulse generating means for controlling an operation of the switching means. The clamp pulse generating means outputs a plurality of clamp pulses before the image sensor outputs on line in the high speed mode. No clamp pulse generating means outputs a clamp pulse during the image sensor outputs on one line in the high speed mode.

Further, the second reader preferably comprises timing generating means for generating a driving signal of the image sensor. The frequency of a basic clock signal supplied to this timing generating means in the high speed mode is preferably higher than that in the high precise mode.

In the first reader, outputs of the light receiving portions arranged in odd and even series of the image sensor are alternately supplied to the first AD converter in the high precise mode. For example, the output of a light receiving portion arranged in the odd series is supplied to the first AD converter in the high speed mode. Further, the output of a light receiving portion arranged in the even series is supplied to the second AD converter in the high speed mode.

In the second reader, each of image sensor outputs is clamped in the high precise mode. The image sensor outputs are clamped in a unit of one line period in the high speed mode, Further objects and advantages of the present invention will be apparent from the following description of the preferred embodiments of the present invention as illustrated in the accompanying drawings.

BRIEF DESCRIPTION OF THE DRAWINGS

FIG. 1(i) and FIG. 1(ii) are diagrams of a reader in accordance with one embodiment of the present invention.

FIG. 8a is a diagram of a basic timing generating circuit at the time of the high precise mode in accordance with one embodiment of the present invention;

DESCRIPTION OF THE PREFERRED EMBODIMENTS

The preferred embodiments of a reader in the present invention will next be described in detail with reference to the accompanying drawings.

Figure 1:
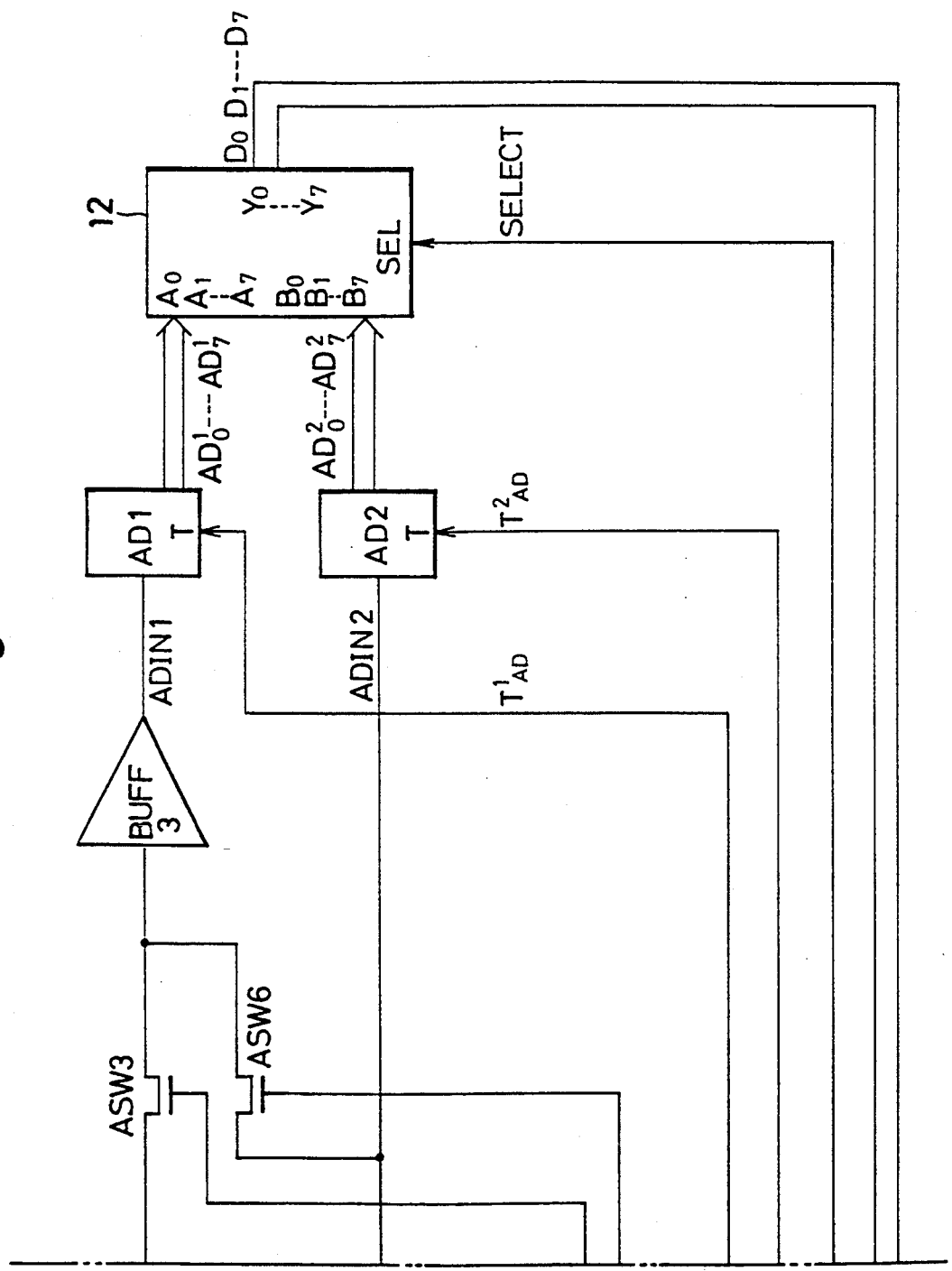
Figure 2:
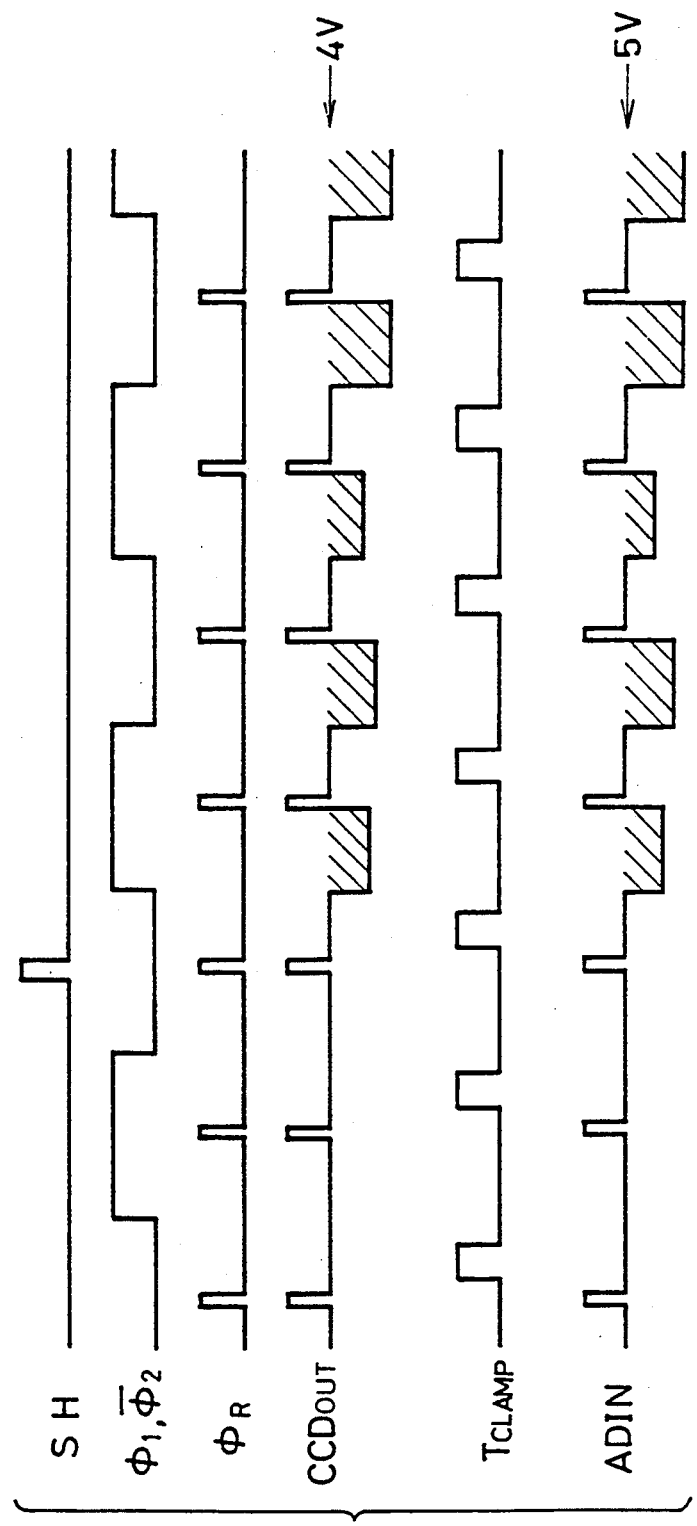
FIG. 2 is a timing chart of signals of a general reader.
Figure 3:
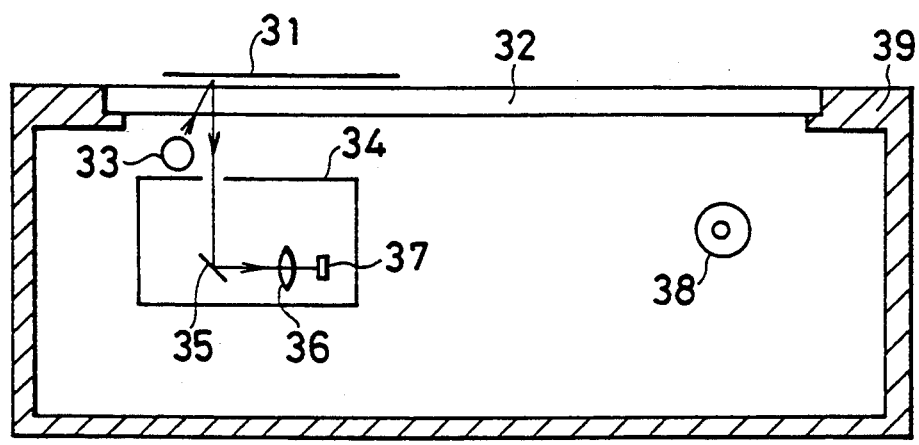
FIG. 3 is a schematic view of a reader.
Figure 4:
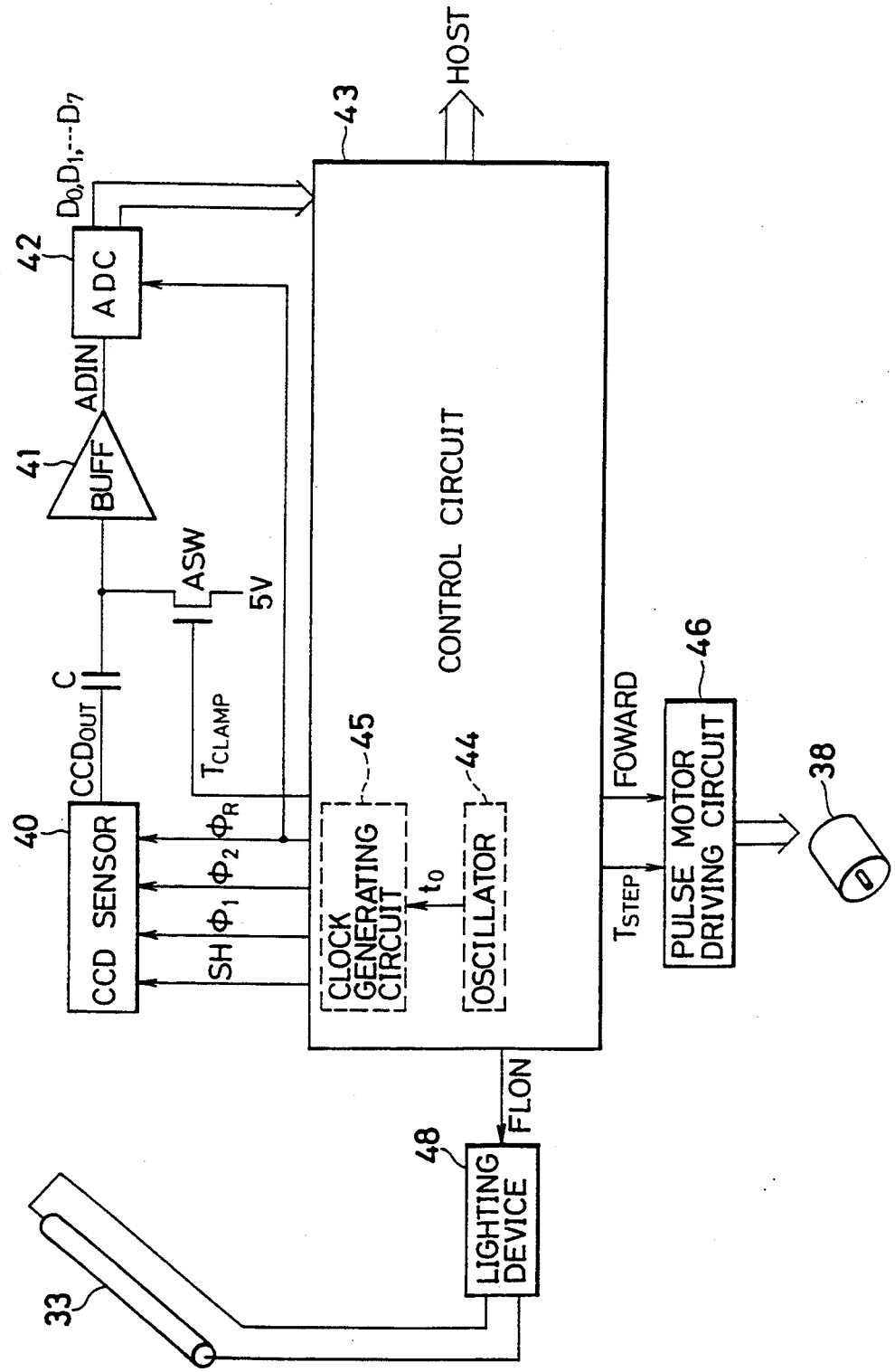
FIG. 4 is a block diagram of the general reader.
Figure 5:
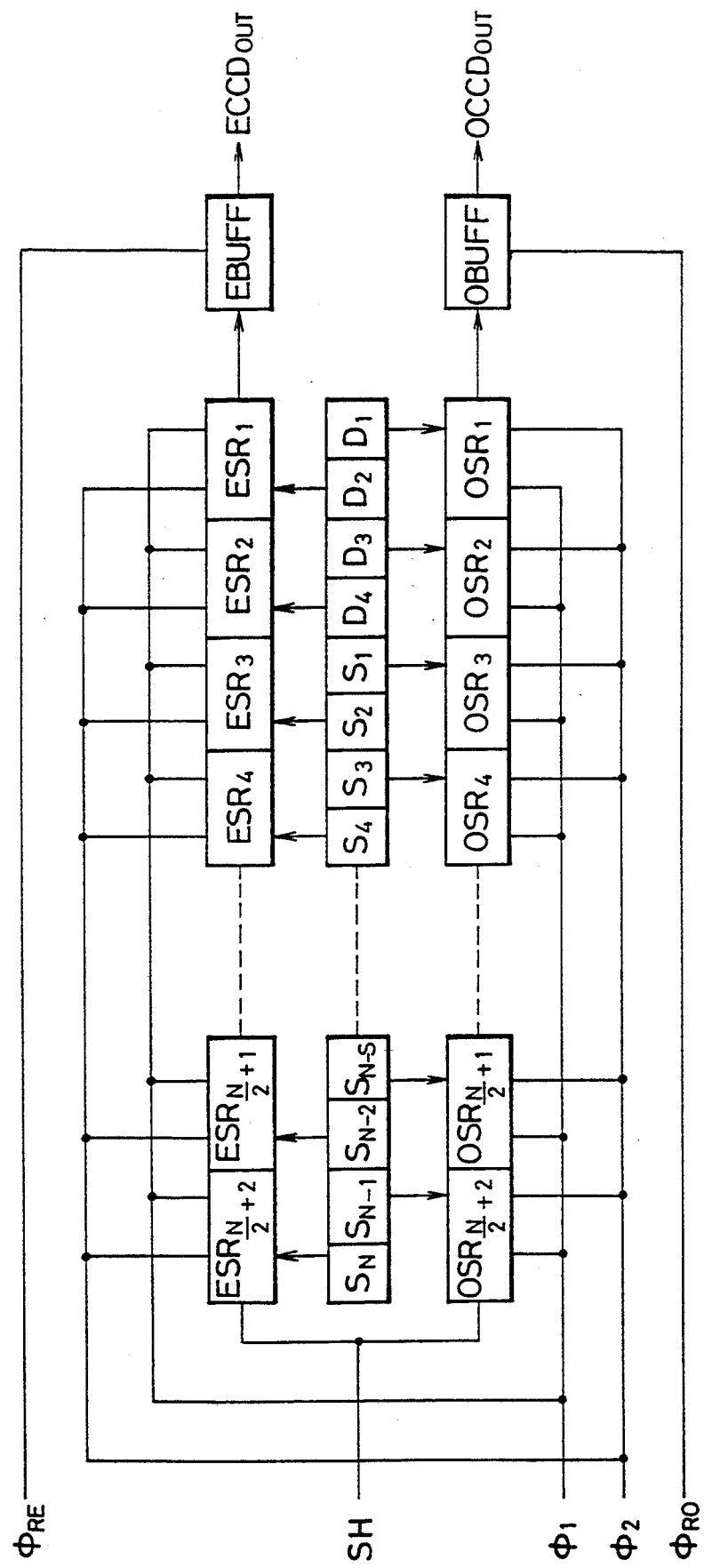
FIG. 5 is a block diagram showing the construction of a charge coupled device (CCD) having two output channels.

FIG. 1 is a block diagram of a reader in accordance with one embodiment of the present invention. In this embodiment, the reader has two operating modes composed of a high precise mode for reading an image with high precision and a high speed mode for reading the image at a high speed. The high precise mode is set when a signal FINE supplied to a control circuit 13 from its exterior shows value "1". The high speed mode is set when this signal FINE shows value "0". Reference numeral 11 designates a CCD sensor shown in FIG. 5. A terminal portion of an odd side output $OCCD_{OUT}$ of the CCD sensor 11 is connected to one ends of capacitors C1 and C2. The other end of the capacitor C1 is connected to an input portion of a buffer BUFF1. The other end of the capacitor C2 is connected to the input portion of the buffer BUFF1 through a transistor ASW1. A negative output portion of the signal FINE of the control circuit 13 is connected to a gate of the transistor ASW1. A drain of a clamp transistor ASW2 is connected to the input portion of the buffer BUFF1.

An output portion of an odd side clamp signal $T_{CLO}$ of the control circuit 13 is connected to a gate of the clamp transistor ASW2. A source of the clamp transistor ASW2 is connected to a power source of 5 V. An ADINO output portion of the buffer BUFF1 is connected to a drain of a transistor ASW3. A terminal portion of a signal $\phi_2$ is connected to a gate of the transistor ASW3. A source of the transistor ASW3 is connected to an input portion of a buffer BUFF3. An ADIN1 output portion of the buffer BUFF3 is connected to a data input portion of an AD converter AD1. Each of terminal portions of outputs $AD_0^1$ to $AD_7^1$ converter AD1 is connected to each of terminal portions of inputs $A_0$ to $A_7$ of a data selector 12. A $T_{AD}^1$ output portion of the control circuit 13 is connected to a T-input portion of the AD converter AD1.

A terminal portion of an even side output $ECCD_{OUT}$ of the CCD sensor 11 is connected to one ends of capacitors C3 and C4. The other end of the capacitor C3 is connected to an input portion of a buffer BUFF2. The other end of the capacitor C4 is connected to the input portion of the buffer BUFF2 through a transistor ASW4. A negative output portion of the signal FINE of the control circuit 13 is connected to a gate of the transistor ASW4. A drain of a clamp transistor ASW5 is connected to the input portion of the buffer BUFF2. An output portion of an even side clamp signal $T_{CLE}$ of the control circuit 13 is connected to a gate of the clamp transistor ASW5. A source of the clamp transistor ASW5 is connected to a power source of 5 V.

An ADINE output portion of the buffer BUFF2 is connected to a source of a transistor ASW6 and a data input portion of an AD converter ADZ. A drain of the transistor ASW6 is connected to the input portion of the buffer BUFF3. A terminal portion of a signal $\phi_1$ is connected to a gate of the transistor ASW6. Each of terminal portions of outputs $AD_0^2$ to $AD_7^2$ of the AD converter AD2 is connected to each of terminal portions of inputs $B_0$ to $B_7$ of the data selector 12. A $T_{AD}^2$ output portion of the control circuit 13 is connected to a T-input portion of the AD converter AD2. A SELECT signal is supplied from the control circuit 13 to a SEL input portion of the data selector 12. Each of terminal portions of outputs $D_0$ to $D_7$ of the data selector 12 is connected to an input portion of the control circuit 13.

FIGS. 8a to 8e show a timing generating circuit arranged within the control circuit 13. Reference numeral 801 designates an oscillator for generating a reference clock signal. Reference numerals 802 and 807 respectively designate a counter for 1/12 frequency division and a counter for 1/6 frequency division. Each of reference numerals 803 and 808 designates a decoder. Each of reference numerals 805 and 810 designates a counter for 1/K frequency division. In this case, K is set to 2048+32=2080. Each of reference numerals 818 to 822 designates a D-flip flop circuit which can be set and reset. Terminal portions of outputs $Q_A^1$, $Q_B^1$, $Q_C^1$ and $Q_D^1$ of the 1/12 frequency dividing counter 802 are respectively connected to terminal portions of inputs $A^1$, $B^1$, $C^1$ and $D^1$ of the decoder 803. The following Table 1 shows the relation between outputs of the 1/12 frequency dividing counter 802 and the decoder 803.

TABLE 1

|   | $Q_A^1$ | $Q_B^1$ | $Q_C^1$ | $Q_D^1$ | $a^1$ | $b^1$ | $c^1$ | $d^1$ | $e^1$ | $f^1$ | $g^1$ | $h^1$ | $i^1$ | $j^1$ | $k^1$ | $l^1$ |
|---|---|---|---|---|---|---|---|---|---|---|---|---|---|---|---|---|
| 0 | 0 | 0 | 0 | 0 | 1 | 0 | 0 | 0 | 0 | 0 | 0 | 0 | 0 | 0 | 0 | 0 |
| 1 | 1 | 0 | 0 | 0 | 0 | 1 | 0 | 0 | 0 | 0 | 0 | 0 | 0 | 0 | 0 | 0 |
| 2 | 0 | 1 | 0 | 0 | 0 | 0 | 1 | 0 | 0 | 0 | 0 | 0 | 0 | 0 | 0 | 0 |
| 3 | 1 | 1 | 0 | 0 | 0 | 0 | 0 | 1 | 0 | 0 | 0 | 0 | 0 | 0 | 0 | 0 |
| . | . | . | . | . | . | . | . | . | . | . | . | . | . | . | . | . |
| 11 | 1 | 1 | 0 | 1 | 0 | 0 | 0 | 0 | 0 | 0 | 0 | 0 | 0 | 0 | 0 | 1 |

The following Table 2 shows the relation between outputs $Q_A^2$, $Q_B^2$, $Q_C^2$ and $Q_D^2$ of the 1/6 frequency dividing counter 807 and outputs of the decoder 808.

TABLE 2

|   | $Q_A^2$ | $Q_B^2$ | $Q_C^2$ | $a^2$ | $b^2$ | $c^2$ | $d^2$ | $e^2$ | $f^2$ |
|---|---|---|---|---|---|---|---|---|---|
| 0 | 0 | 0 | 0 | 0 | 1 | 0 | 0 | 0 | 0 |
| 1 | 1 | 0 | 0 | 0 | 0 | 1 | 0 | 0 | 0 |
| 2 | 0 | 1 | 0 | 0 | 0 | 0 | 1 | 0 | 0 |
| 3 | 1 | 1 | 0 | 0 | 0 | 0 | 0 | 1 | 0 |
| 4 | 0 | 0 | 1 | 0 | 0 | 0 | 0 | 1 | 0 |
| 5 | 1 | 0 | 1 | 0 | 0 | 0 | 0 | 0 | 1 |

After the 1/K (in reality 1/2080) frequency dividing counter 805 is reset, an output $OUT^1$ of this counter 805 rises to a high voltage level by a fall of 2080-th $T_{11}^1$. Immediately after this rise, the voltage of an inverted signal $T_{1/K}^1$ of this output $OUT^1$ is reduced to a low voltage level. Thus, each of the counters 802 and 805 is reset and the flip-flop circuit 819 is set.

After the 1/K frequency dividing counter 810 is reset, an output $OUT^2$ of this counter 810 also rises to a high voltage level by a fall of 2080-th $T_5^2$. Immediately after this rise, each of the counters 807 and 810 is reset and each of the flip-flop circuits 821 and 822 is set by an inverted signal $T_{1/K}^2$ of this output $OUT^2$.

After the flip-flop circuit 822 is set by $T_{1/K}^2$, this flip-flop circuit 822 is reset by a rise of output $Q^2$ of the counter 810. This output $Q^2$ rises from value "0" to value "1" by a fall of third $T_5^2$ after the counter 810 is reset.

The decoder 803 generates CCD sensor driving signals $\phi_{RE}^1$ and $\phi_{RO}^1$, an odd side AD converter sampling signal $T_{ADO}^1$ and an even side AD converter sampling signal $T_{ADE}^1$ at a time of the high precise mode. The D-flip flop circuit 818 generates CCD sensor driving signals $\phi_1^1$ and $\phi_2^1$ at the time of the high precise mode. The D-flip flop circuit 819 generates a CCD sensor driving signal $SH^1$ at the time of the high precise mode. An OR gate 823 generates an odd side clamp signal $T_{CLO}^1$ at the time of the high precise mode. An OR gate 824 generates an even side clamp signal $T_{CLE}^1$ at the time of the high precise mode.

The decoder 808 generates CCD sensor driving signals $\phi_{RE}^2$ and $\phi_{RO}^2$, an odd side AD converter sampling signal $T_{ADO}^2$ and an even side AD converter sampling signal $T_{ADE}^2$ at a time of the high speed mode. The D-flip flop circuit 820 generates CCD sensor driving signals $\phi_1^2$ and $\phi_2^2$ at the time of the high speed mode. The D-flip flop circuit 821 generates a CCD sensor driving signal $SH^2$ at the time of the high speed mode. An OR gate 825 and an AND gate 827 generate an odd side clamp signal $T_{CLO}^2$ at the time of the high speed mode. An OR gate 826 and an AND gate 828 generate an even side clamp signal $T_{CLE}^2$ at the time of the high speed mode.

Reference numeral 831 designates a data selector. A SEL input portion of this data selector 831 receives a FINE signal. When FINE="1" is formed, $Y_i = A_i$ is formed. In contrast to this, when FINE="0" is formed, $Y_i = B_i$ is formed. Terminals A1, A2 and A3 of the data selector 831 are respectively connected to terminal portions of signals $SH^1$, $\phi_1^1$ and $\phi_2^1$. Terminals A4, A5 and A8 of the data selector 831 are respectively connected to terminal portions of signals $\phi_{RO}^1$, $\phi_{RE}^1$ and $T_{CLO}^1$. Terminals A7, A8 and A9 of the data selector 831 are respectively connected to a terminal portion of signal $T_{CLE}^1$, a terminal portion of a logical OR output of signals $T_{ADO}^1$ and $T_{ADE}^1$, and a terminal portion of signal $T_{ADE}^1$. Terminal A10 of the data selector 831 is connected to a power source of 5 V.

Terminals B1, B2 and B3 of the data selector 831 are respectively connected to terminal portions of signals $SH^2$, $\phi_1^2$ and $\phi_2^2$. Terminals B4, B5 and B8 of the data selector 831 are respectively connected to terminal portions of signals $\phi_{RO}^2$, $\phi_{RE}^2$ and $T_{CLO}^2$. Terminals B7, B8 and B9 of the data selector 831 are respectively connected to terminal portions of signals $T_{CLE}^2$, and $T_{ADO}^2$ and $T_{ADE}^2$. Terminal B10 of the data selector 831 is connected to a terminal portion of signal $\phi_1$.

Terminals Y1, Y2 and Y3 of the data selector 831 respectively output signals SH, $\phi_1$ and $\phi_2$. Terminals Y4, Y5 and Y6 of the data selector respectively output signals $\phi_{RO}$, $\phi_{RE}$ and $T_{CLO}$. Terminals Y7, Y8 and Y9 of the data selector 831 respectively output signals $T_{CLE}$, $T_{AD}^1$ and $T_{AD}^2$. Terminal Y10 of the data selector 831 outputs signal SELECT.

When the signal FINE shows value "1", the above signals are respectively set to the following values.

$SH = SH^1$, $\phi_1 = \phi_1^1$, $\phi_2 = \phi_2^1$, $\phi_{RO} = \phi_{RO}^1$,
$\phi_{RE} = \phi_{RE}^1$, $T_{CLO} = T_{CLO}^1$, $T_{CLE}^1$,
$T_{AD}^1 = T_{ADO}^1$. OR. $T_{ADE}^1$, $T_{AD}^2 = T_{ADE}^1$,
SELECT = 5 V In contrast to this, when the signal FINE shows value "0", the above signals are respectively set to the following values.

$SH = SH^2$, $\phi_1 = \phi_1^2$, $\phi_2 = \phi_2^2$, $\phi_{RO} = \phi_{RO}^2$,
$\phi_{RE} = \phi_{RE}^2$, $T_{CLO} = T_{CLO}^2$, $T_{CLE} = T_{CLE}^2$,
$T_{AD}^1 = T_{ADO}^2$, $T_{AD}^2 = T_{ADE}^2$, SELECT = $\phi_1$ An operation of the reader in the embodiment shown in FIG. 1 will next be explained. In this embodiment, the reader has two operating modes composed of a high precise mode for reading an image with high precision and a high speed mode for reading the image at a high speed. An operation of the reader in the high precise mode will first be described. When the high precise mode is set, signal FINE="1" is formed. When FINE="1" is formed, a negative signal of FINE shows value "0" so that each of transistors ASW1 and ASW4 is turned off. Only capacitors C1 and C3 for clamping fulfill their functions at the time of the high precise mode. For example, capacities of the capacitors C1 and C3 are equal to each other and are respectively set to the same constant 1000 pF as a general scanner. Transistors ASW3 and ASW6 alternately transmit signals ADINO and ADINE to the ADIN1 input portion of the AD converter AD1. When FINE="1" is formed, the SELECT signal of the data selector shows value "1". Accordingly, at this time, the data selector outputs an output of the AD converter AD1 at any time. Namely, $D_0 = AD_0^1$, $D_1 = AD_1^1$, - - - , $D_7 = AD_7^1$ are formed.

In this case, only the output of the AD converter AD1 is used since no AD converters AD1 and AD2 have the same AD-converting characteristics and the AD-converting characteristics are periodically dispersed with respect to odd and even converters when both the AD converters AD1 and AD2 are used.

An output $OCCD_{OUT}$ of the CCD sensor 11 is clamped and set to 5 V by the capacitor C1 and the transistor ASW2. A clamped signal is amplified by the buffer BUFF1 and is outputted as signal ADINO. An output $ECCD_{OUT}$ of the CCD sensor 11 is clamped and set to 5 V by the capacitor C3 and the transistor ASW4. A clamped signal is amplified by the buffer BUFF2 and is outputted as signal ADINE. The signals ADINO and ADINE are respectively inputted by the transistors ASW3 and ASW6 to the buffer BUFF3 alternately with respect to time. An output of the buffer BUFF3 is converted to a digital signal by the AD converter AD1. Digital signals $AD_0^1, ---, AD_7^1$ are selected by the data selector 12 and are outputted as $D_0, ---, D_7$ to the control circuit 13.

An operation of the reader in the high speed mode will next be described. FINE="0" is formed when the high speed mode is set. A negative signal of FINE shows value "1". Each of the transistors ASW1 and ASW4 is turned on and capacitors C2 and C4 function as capacitors for clamping. An output $OCCD_{OUT}$ of the CCD sensor 11 is clamped by the capacitors C1 and C2 and the transistor ASW2. A clamped animal is amplified by the buffer BUFF1 and is transmitted to the buffer BUFF3 through the transistor ASW3. The clamped signal amplified by the buffer BUFF3 is converted to each of digital signals $AD_0^1, ---, AD_7^1$ by the AD converter AD1. The digital signals are outputted as $D_0, ---, D_7$ by the data selector and are transmitted to the control circuit 13. An output $ECCD_{OUT}$ of the CCD sensor 11 is clamped by the capacitors C3 and C4 and the transistor ASW5 and is amplified by the buffer BUFF2. The amplified signal is converted to each of digital signals $AD_0^2, ---, AD_7^2$ by the AD converter AD2. The digital signals are outputted as $D_0, ---, D_7$ by the data selector and are transmitted to the control circuit 13.

Figure 7A:
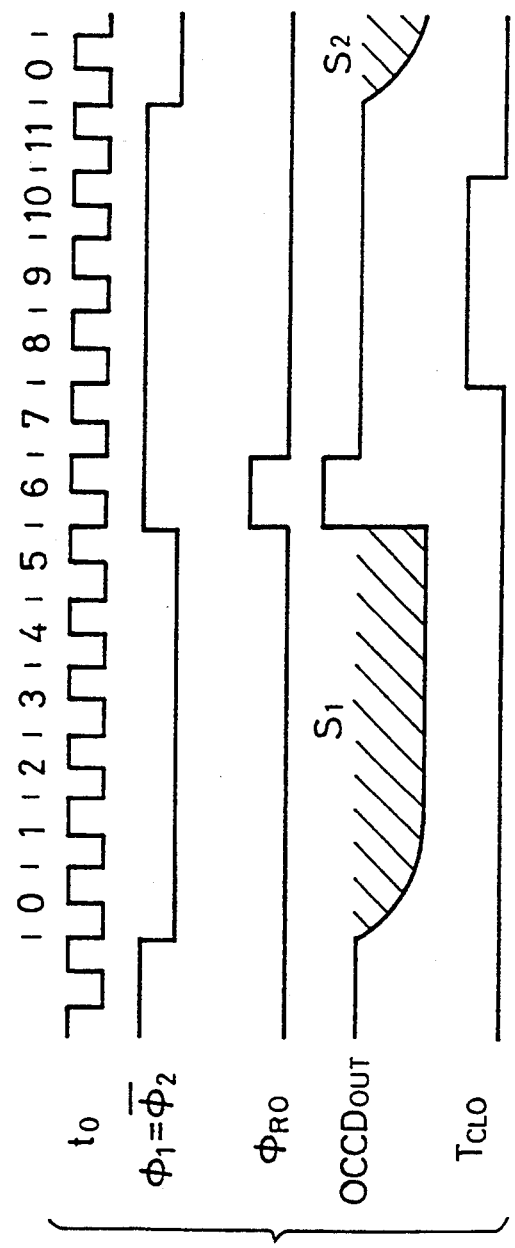
FIG. 7a is a basic timing chart of the reader at the time of the high precise mode.
Figure 7B:
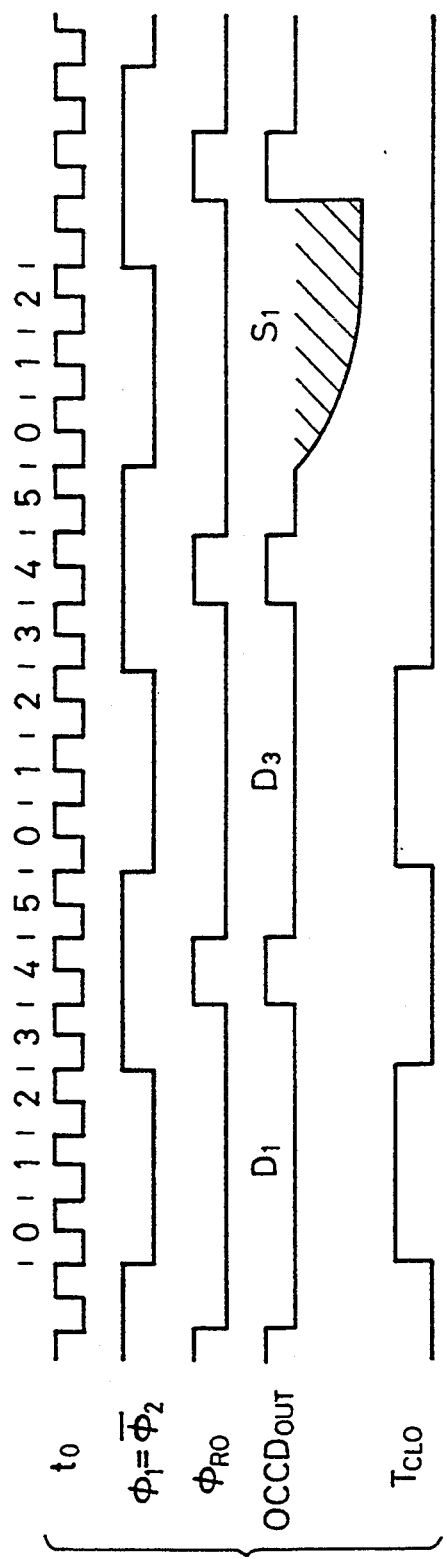
FIG. 7b is a basic timing chart of the reader at the time of the high speed mode.
Figure 8B:
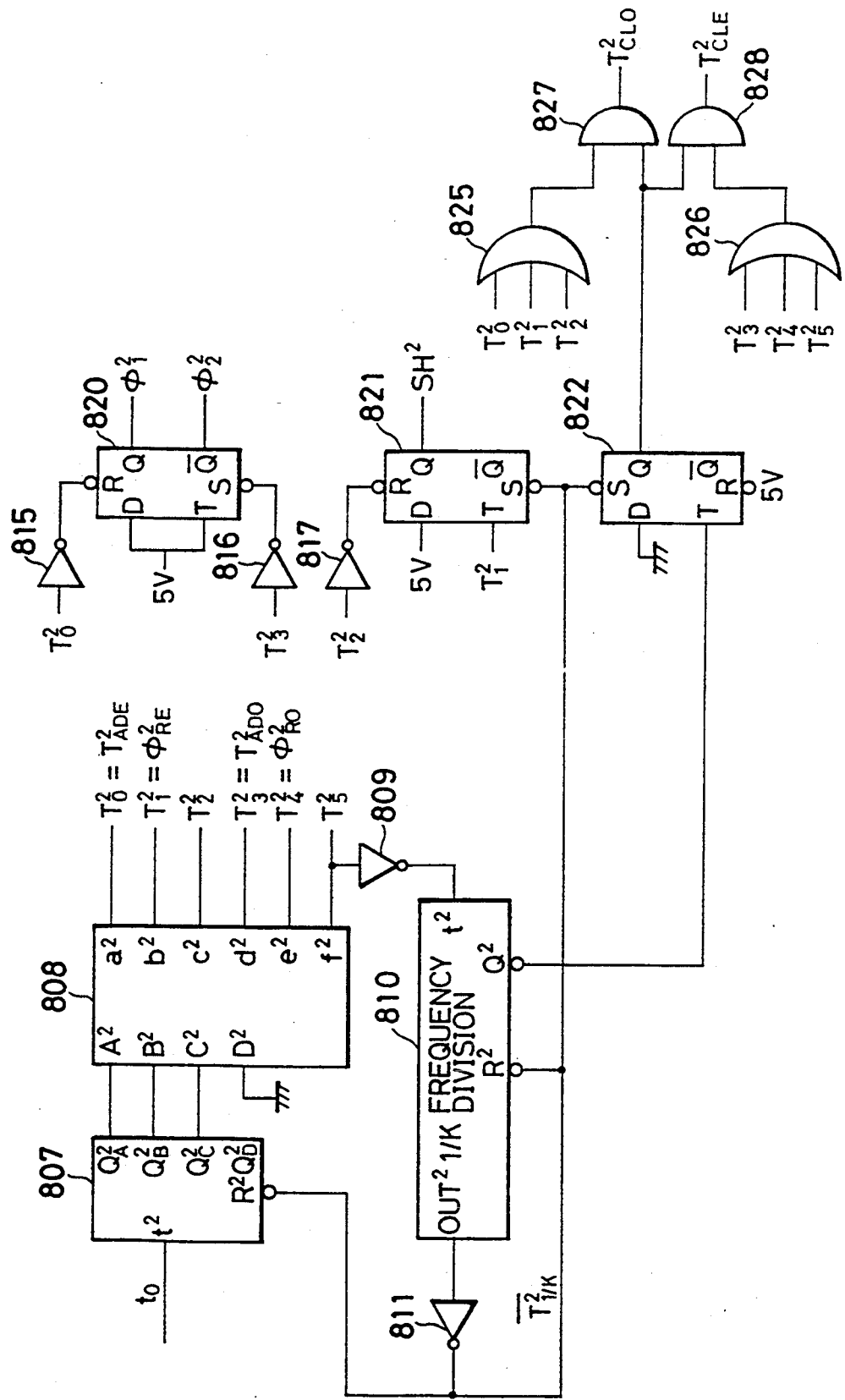
FIG. 8b is a diagram of a basic timing generating circuit at the time of the high speed mode in accordance with one embodiment of the present invention.
Figure 8C:
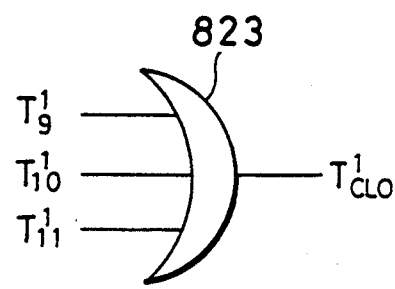
FIG. 8c is a diagram of an odd side clamp signal generating circuit at the time of the high precise mode in accordance with one embodiment of the present invention.
Figure 8D:
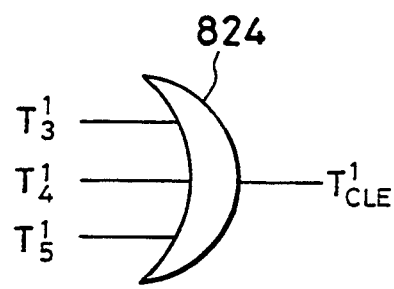
FIG. 8d is a diagram of an even side clamp signal generating circuit at the time of the high precise mode in accordance with one embodiment of the present invention.
Figure 8E:
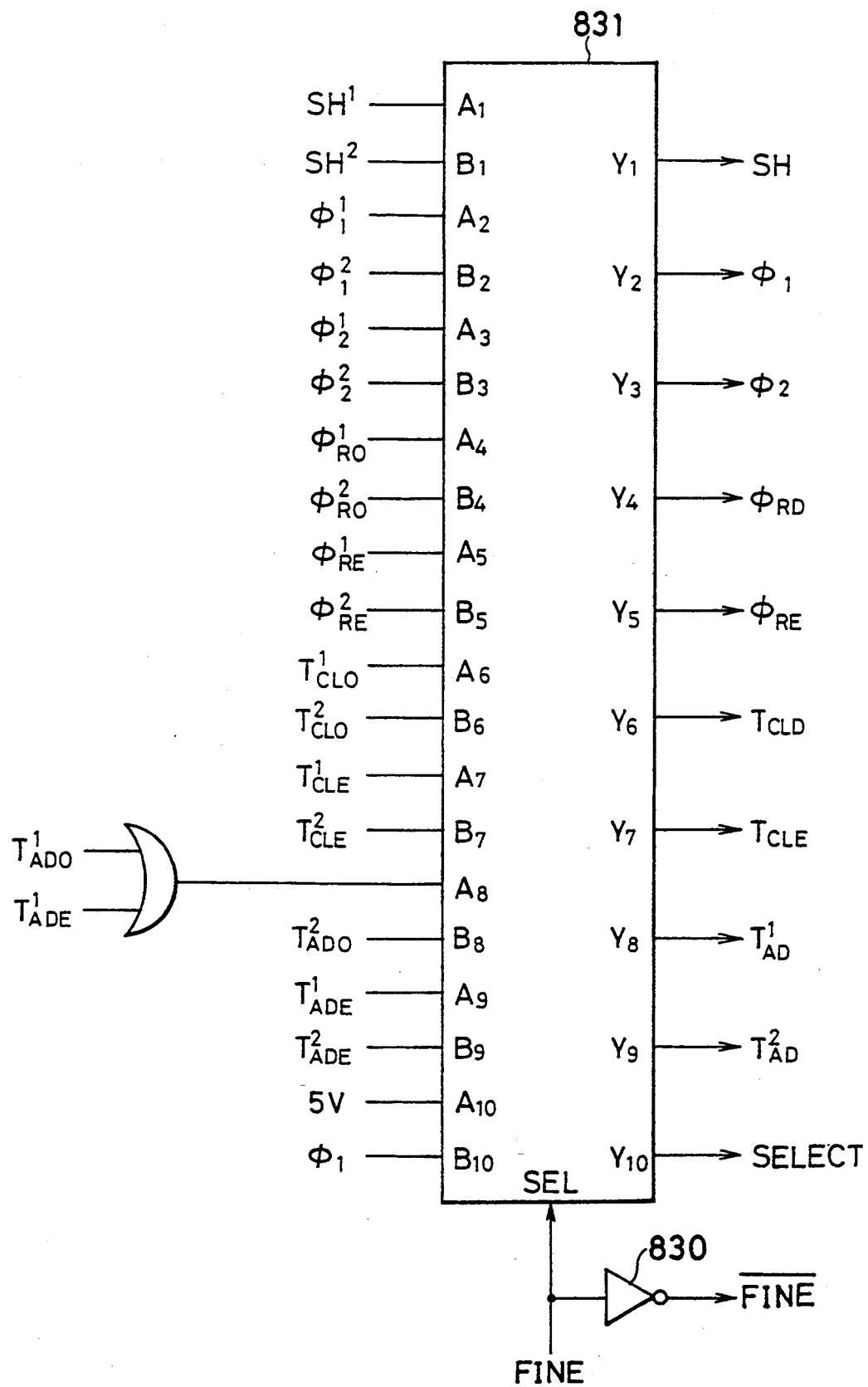
FIG. 8e is a diagram of the basic timing generating circuit at a final stage in accordance with one embodiment of the present invention.
Figure 9:
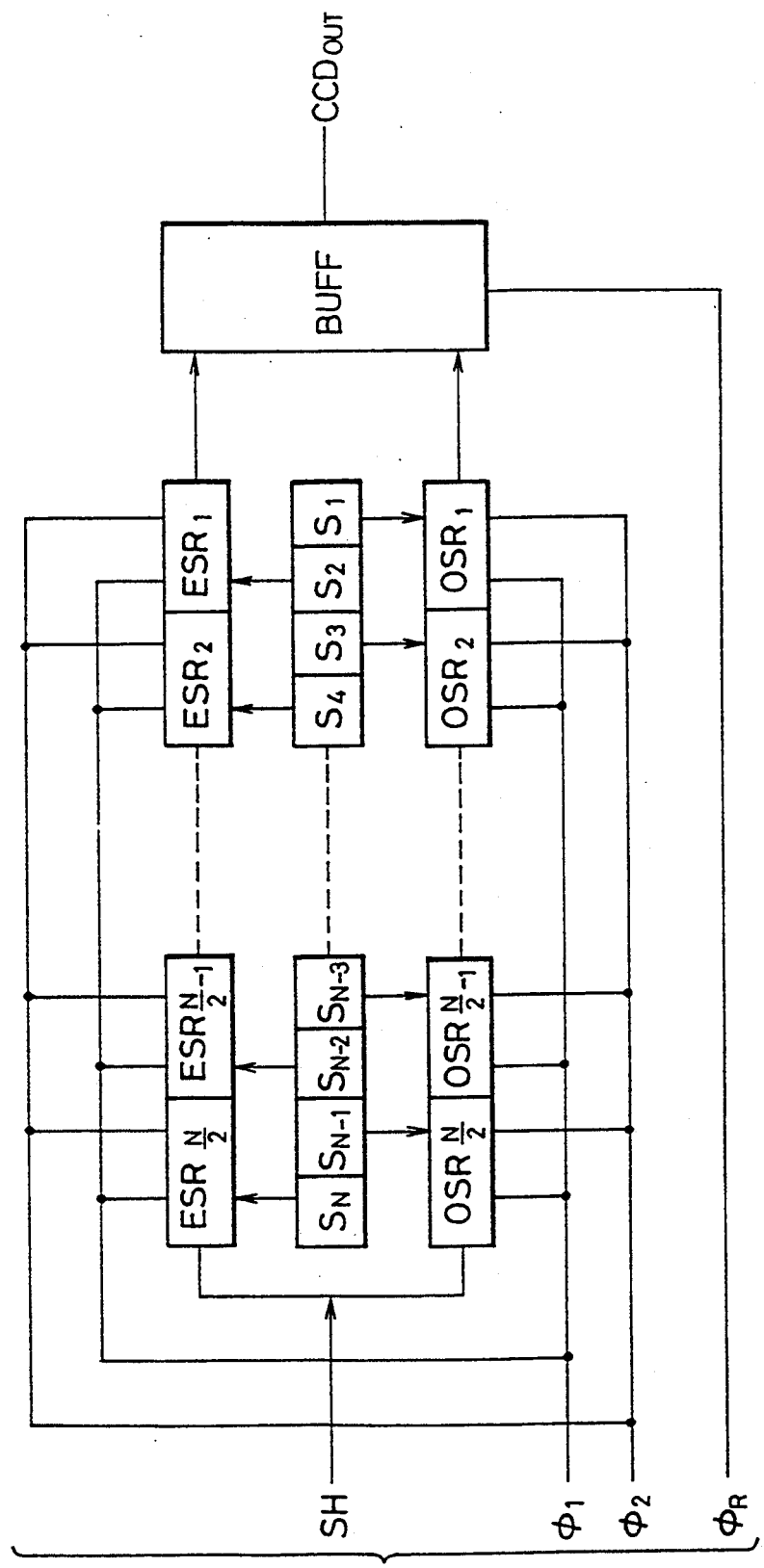
FIG. 9 is a block diagram of a charge coupled device (CCD) used in the general reader.
Figure 10:
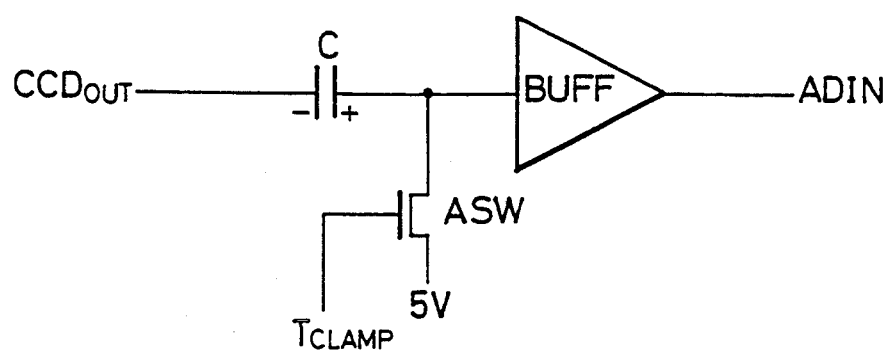
FIG. 10 is a view for explaining operations of an analog switch ASW and a capacitor C.
Figure 11:
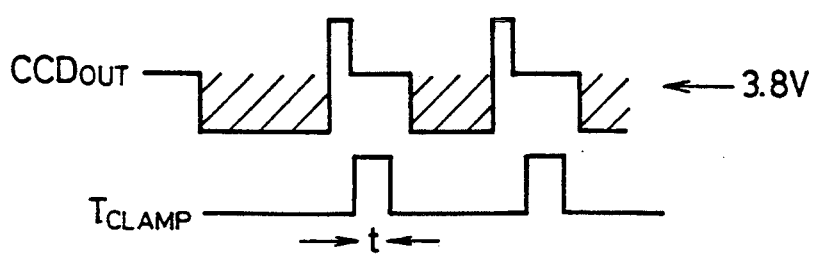
FIG. 11 is a view for explaining random noises.

FIGS. 7a and 7b are respectively timing charts of the reader at the times of the high precise mode and the high speed mode. FIGS. 7a and 7b show timings of a reference clock signal $t_0$, CCD sensor driving signals $\phi_1$ and $\phi_{RO}$, a CCD sensor odd side output $OCCD_{OUT}$ and an odd side clamp signal $T_{CLO}$.

A time of the basic clock signal of the CCD sensor is set to $12 \times t_0$ in the high precise mode and is set to $6 \times t_0$ in the high speed mode. The time of the basic clock signal of the CCD sensor in the high speed mode can be reduced since no clamp pulse is generated with respect to one output of the CCD sensor and an output period of the CCD sensor is reduced. A period about the basic clock signal on one line is calculated as follows. The number N of pixels of the CCD sensor is set to 2048. $2048+32=2080=K$ basic clock signals of the CCD sensor are used as one period with respect to a start pulse SH. In this case, the line period is set to $2080 \times 12 \times t_0 \times \frac{1}{2}$ in the high precise mode and is set to $2080 \times 6 \times t_0 \times \frac{1}{2}$ in the high speed mode. Namely, an operating speed of the reader in the high speed mode is twice that in the high precise mode. At the time of the high speed mode, each of the transistors ASW1 and ASW4 is turned on and capacitors for clamping (shifting DC voltage levels) are constructed by capacitors C1+C2 and capacitors C3+C4. If $t_0$ is set to 100 nsec, one scanning period in the high speed mode is set to 0.6 msec. When input resistances of the buffers BUFF1 and BUFF2 are set to 1 MΩ, capacities of the capacitors C1+C2 are provided as follows.

$(C1+C2) \times 1M\Omega >> 0.6$ msec $C1+C2 >> 600$ PF $\therefore C1+C2 \approx 0.1 \mu F$ Since $C_1 << C_2$ is formed, it is necessary to set $C_2$ to about 0.1 $\mu F$. Similarly, $C_4$ is selectively set to 0.1 $\mu F$. 1 $\mu F$ is about 150 times 600 DF.

Figure 6A:
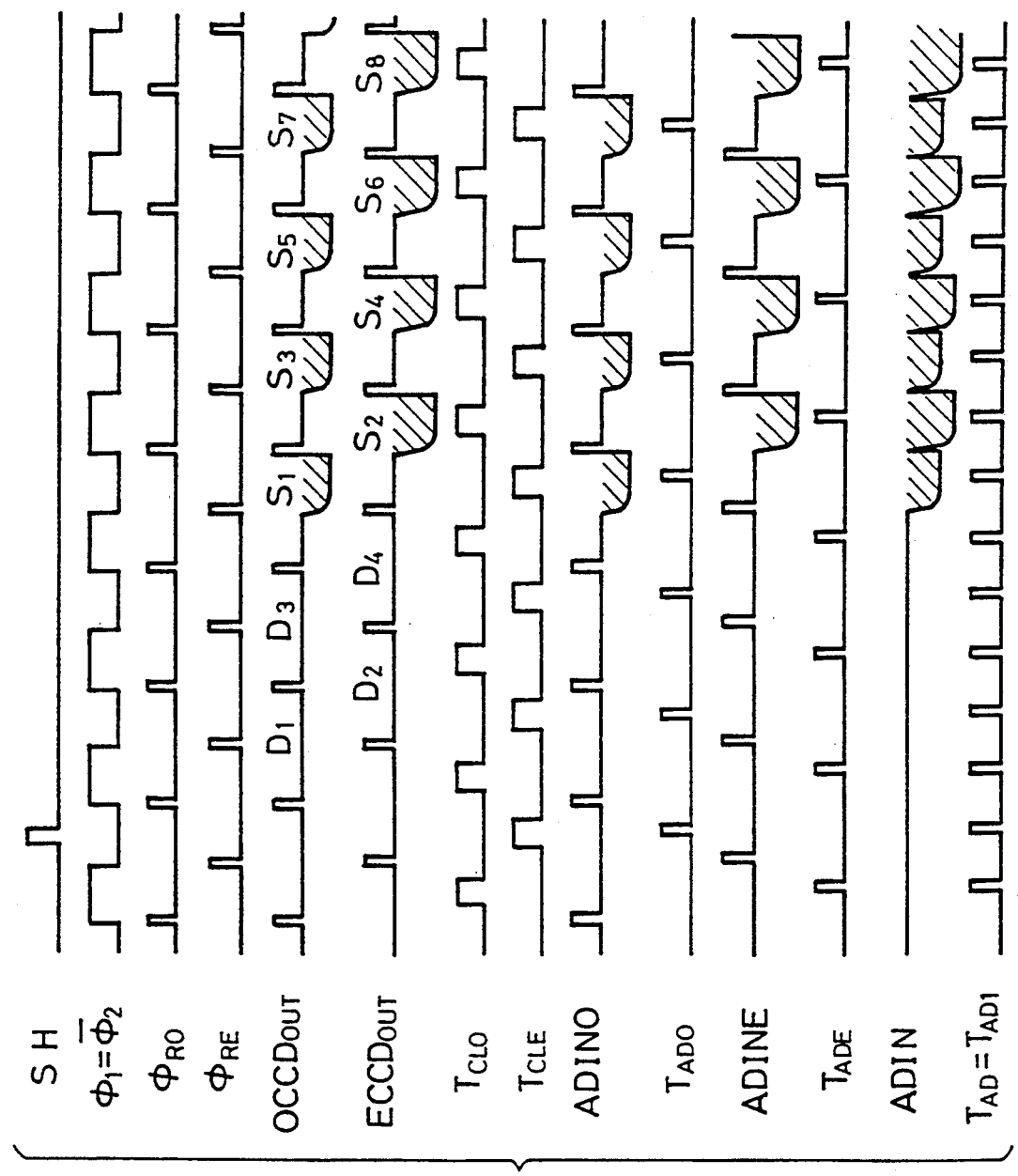
FIG. 6a is a timing chart of the reader at the time of a high precise mode.

FIG. 6a is a timing chart of the reader in the high precise mode. FIG. 6a shows timings of CCD sensor driving signals SH, $\phi_1$, $\phi_{RO}$ and $\phi_{RE}$, a CCD sensor odd side output $OCCD_{OUT}$, a CCD sensor even side output $ECCD_{OUT}$, an odd side clamp signal $T_{CLO}$, an even side clamp signal $T_{CLE}$, an output ADINO of the buffer BUFF1, an even side AD converter sampling signal $T_{ADO}$, an output ADINE of the buffer BUFF2, an odd side AD converter sampling signal $T_{ADE}$, an output ADIN of the buffer BUFF3, and a sampling signal $T_{AD}$ of the AD converter AD1.

Figure 6B:
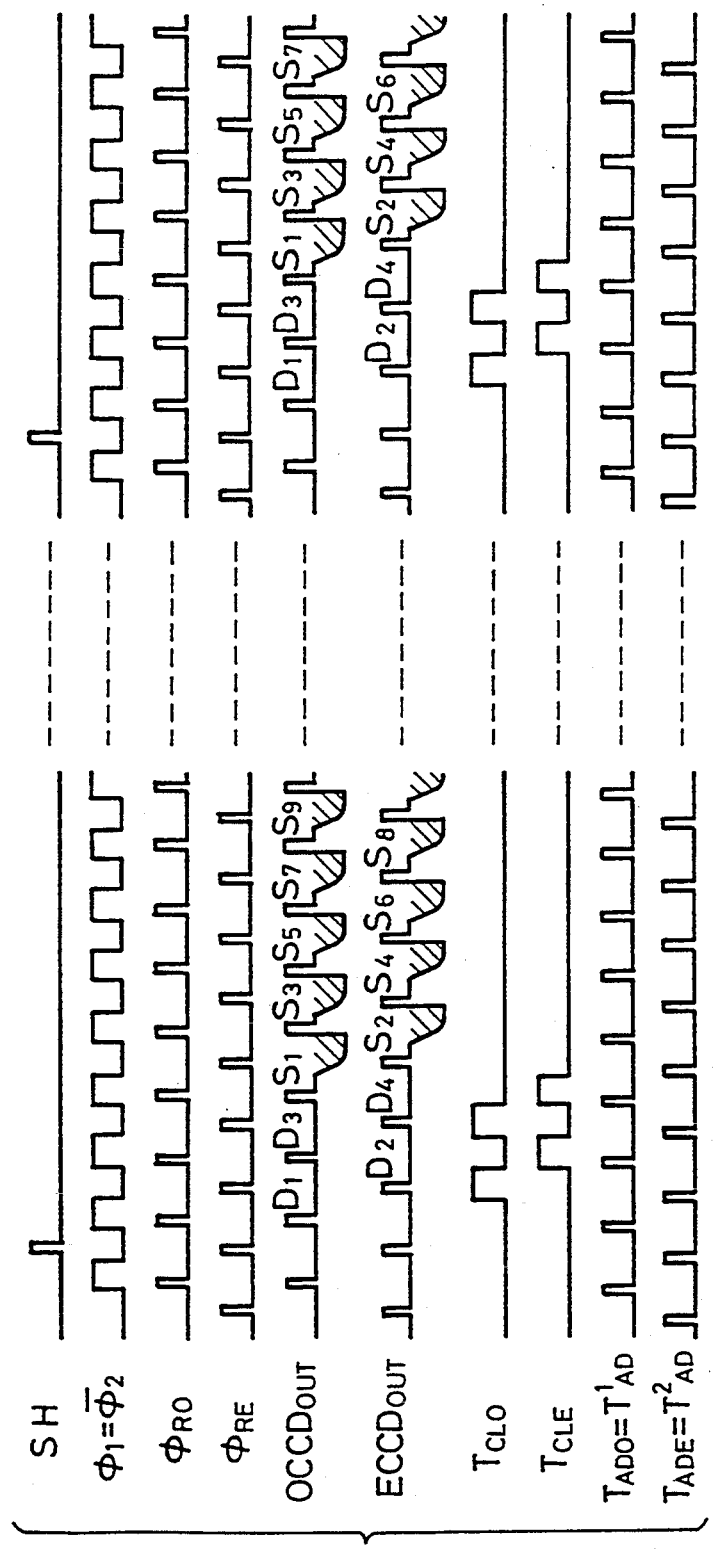
FIG. 6b is a timing chart of the reader at the time of a high speed mode.

FIG. 6b is a timing chart of the reader in the high speed mode. FIG. 6b shows timings of CCD sensor driving signals SH, $\phi_1$, $\phi_{RO}$ and $\phi_{RE}$, a CCD sensor odd side output $OCCD_{OUT}$, a CCD sensor even side output $ECCDOU_T$, an odd side clamp signal $TCL_O$, an even side clamp signal $T_{CLE}$, a sampling signal $T_{AD}^1$ of the AD converter AD1, and a sampling signal $T_{AD}^2$ of the AD converter AD2.

As can be seen from FIG. 6b, only two clamp pulses are outputted on each of the odd and even sides in the high speed mode before the CCD outputs on one line. No clamp pulse is outputted in the high speed mode during the CCD outputs on one line.

As mentioned above, a reader of the present invention has a CCD sensor for separately outputting outputs of light receiving portions arranged in odd and even series; a first AD converter corresponding to one of the odd and even series outputs; a second AD converter corresponding to the other of the odd and even series outputs; and means for supplying the other of the odd and even series outputs to the first AD converter when a high precise mode is selected. Accordingly, no periodic image stripe is caused in the high precise mode by differences between AD-converting characteristics of the AD converters so that an image having a high quality can be read.

In the present invention, the reader also has DC level clamping means for clamping a DC voltage level of each of CCD outputs in the high precise mode and clamping a DC voltage level of a CCD output in a unit of one line period in a high speed mode. Accordingly, the reader can output an image having reduced random noises in the high precise mode and can output an image at a very high speed in the high speed mode.

Many widely different embodiments of the present invention may be constructed without departing from the spirit and scope of the present invention. It should be understood that the present invention is not limited to the specific embodiments described in the specification, except as defined in the appended claims.

What is claimed is:

1. A reader having a high precise mode and a high speed mode and comprising:
   an image sensor for separately outputting outputs of light receiving portions arranged in odd and even series;
   a first AD converter corresponding to one of said odd and even series outputs;
   a second AD converter corresponding to the other of said odd and even series outputs; and
   means for supplying the other of said odd and even series outputs to the first AD converter when the high precise mode is selected.

2. A reader as claimed in claim 1, wherein said image sensor comprises a CCD sensor.

3. A reader as claimed in claim 1, wherein the reader further comprises output selecting means for inputting outputs of said first and second AD converters thereto;
the output selecting means alternately outputs the outputs from the first and second AD converters in the high speed mode; and
the output selecting means outputs the output from the first AD converter in the high precise mode.

4. A reader as claimed in claim 1, wherein an image having a high quality is read in the high precise mode and an image is read at a high speed in the high speed mode.

5. A reader as claimed in claim 3, wherein the output of a light receiving portion arranged in the odd series is supplied to the first AD converter in the high speed mode, and the output of a light receiving portion arranged in the even series is supplied to the second AD converter in the high speed mode.

6. A reader as claimed in claim 3, wherein the output selecting means is constructed by a data selector for selecting outputs of the first and second AD converters.

7. A reader as claimed in claim 6, wherein the reader further comprises a control circuit for receiving an output of the data selector and controlling an operation of the image sensor.

8. A reader as claimed in claim 7, wherein the control circuit has a timing generating circuit for generating a driving signal of the image sensor.

9. A reader having a high precise mode and a high speed mode and comprising:
an image sensor;
DC level clamping means for clamping a DC voltage level of each of image sensor outputs in the high precise mode and clamping a DC voltage level of a image sensor output in a unit of one line period in the high speed mode; and
an AD converter for digitally converting the image sensor output clamped at the DC voltage level.

10. A reader as claimed in claim 9, wherein said image sensor comprises a CCD sensor.

11. A reader as claimed in claim 9, wherein said clamping means has switching means connected to a clamp voltage source and a capacitor having a capacity variable in accordance with the high precise mode and the high speed mode.

12. A reader as claimed in claim 11, wherein said clamping means further has clamp pulse generating means for controlling an operation of said switching means;
the clamp pulse generating means outputs a plurality of clamp pulses before the image sensor outputs on line in the high speed mode; and
no clamp pulse generating means outputs a clamp pulse during the image sensor outputs on one line in the high speed mode.

13. A reader as claimed in claim 9, wherein the reader further comprises timing generating means for generating a driving signal of said image sensor; and
the frequency of a basic clock signal supplied to the timing generating means in the high speed mode is higher than that in the high precise mode.

14. A reader as claimed in claim 9, wherein an image having a high quality is read in the high precise mode and an image is read at a high speed in the high speed mode.

15. A reader as claimed in claim 13, wherein the reader further comprises a control circuit for receiving an output of the AD converter and controlling an operation of the image sensor.

16. A reader as claimed in claim 11, wherein the switching means includes a transistor.

* * * * *